Apr. 10, 1923.
C. L. ARCHER
1,451,645
CORD TIRE
Original Filed Feb. 4, 1922
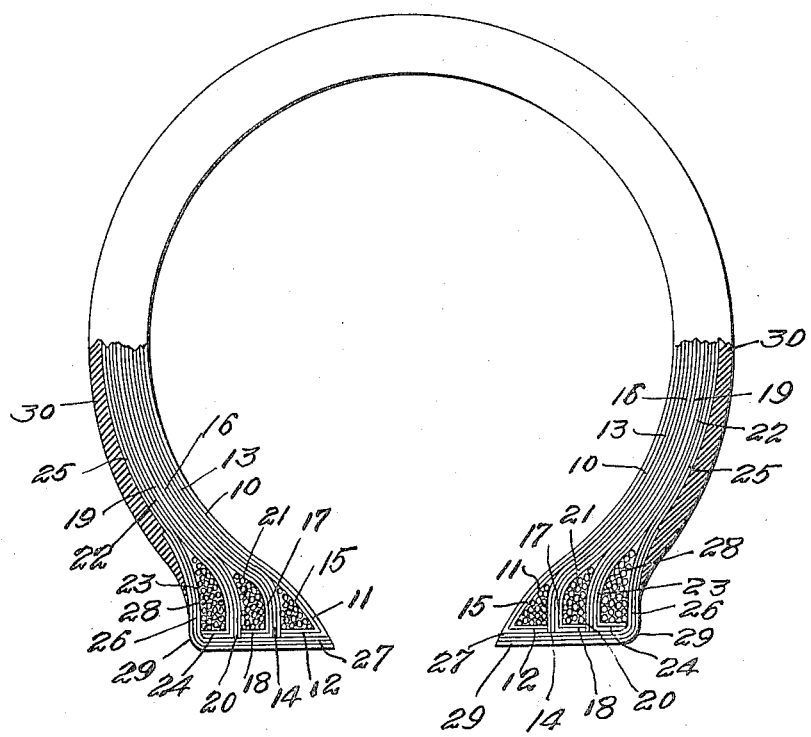
Inventor
C. L. Archer.

Patented Apr. 10, 1923.

1,451,645

UNITED STATES PATENT OFFICE.

CHARLES L. ARCHER, OF DES MOINES, IOWA.

CORD TIRE.

Application filed February 4, 1922. Serial No. 534,091. Renewed March 10, 1923.

*To all whom it may concern:*

Be it known that I, CHARLES L. ARCHER, a citizen of the United States, residing at Des Moines, in the county of Polk and State of Iowa, have invented certain new and useful Improvements in Cord Tires, of which the following is a specification, reference being had therein to the accompanying drawings.

This invention relates to tires and more particularly to pneumatic tires, which are especially adapted for use in connection with motor vehicles.

One object of this invention is the production of a tire, wherein the beads are so formed as to present a compact and strong construction, thus causing the beads to fit at all times very close to the rim of a wheel, thereby eliminating such troubles as rim cutting.

Another object of this invention is the production of a pneumatic tire, wherein the beads are formed by the provision of a plurality of looped portions, which carry suitable filling means, thus forming reinforced beads, thus producing a very strong tire, which may be manufactured at a minimum cost.

One practical form of construction and assembly of the present invention will be hereinafter specifically described and claimed, and is shown in the accompanying drawings, wherein the figure is a fragmentary transverse sectional view of the tire.

Referring specifically to the drawing by numerals, 10 indicates an inner ply of cords, which will be hereinafter referred to as the first ply. This first ply of cords has converging inner end portions, 11, which in turn terminate in the outwardly extending straight portions 12.

A second ply 13 of cords is positioned upon the first ply 10, but the end portions of the cords of this second ply are substantially straight and parallel and for this reason are spaced from the converging end portions 11 of the cords of the first ply 10. The end portions 14 of the second ply engage the tips of the straight portions 12, thereby forming hollow looped portions, which are filled with any suitable filling means, such as cables 15.

A third ply 16 of cords is positioned upon the second ply 13 and the end portions 17 of the third ply are parallel and straight and bear upon the straight end portions 14 of the second ply 13. These end portions 17 terminate in the outwardly extending portions 18, which are similar in construction to the outwardly extending portions 12 of the first ply 10.

A fourth ply 19 of cords is positioned upon the third ply 16 and the end portions 20 of the cords of this ply are parallel and straight and engage the tips of the outwardly extending portions 18 of the third ply 16, thus forming an inclosed looped portion upon each side of the tire and these looped portions are filled with any suitable filling means, such as cables 21. It will be noted that the last mentioned looped portions are similar in construction to and are contiguous to the first-mentioned looped portions.

A fifth ply 22 of cords is positioned upon the fourth ply 19 and the cords of this fifth ply are parallel and straight at their end portions, as shown at 23, the straight end portions 23 bear upon the end portions 20 of the fourth ply and the end portions 23 terminate in the outwardly extending portions 24.

A sixth ply 25 of cords, which is the outer ply, is positioned upon the fifth ply 22 and the cords of this ply have parallel straight portions 26, which are parallel to but spaced from the straight end portions 23 of the cords of the fifth ply 22. The parallel straight portions 26 engage the tips of the outwardly extending portions 24, thereby forming inclosed looped portions, which are adjacent the second mentioned looped portions, and these last mentioned looped portions are filled with any suitable filling means, such as cables 28.

It will be noted that the outwardly extending portions 12, 18, and 24 are in alignment with each other, while the tips of the end portions 14 and 20 are in alignment with the outer surfaces of these outwardly extending portions. It will also be noted that the parallel straight portions 26 of the sixth ply 25 terminates in the inwardly extending elongated straight projections 27 and these projections rest upon the outer surfaces of the outwardly extending portions 12, 18, and 24 and in this manner reinforces the looped portions.

A seventh ply 29 of cords is positioned upon each bead and the seventh ply fits upon the projections 27 and extends approximately to the bases of the looped portions and in this manner constitutes an additional reinforcement for the beads.

To complete the construction of the tire it is, of course, necessary to position a suitable tread 30 upon the sixth and seventh plies of cords. It is obvious that any suitable tread may be employed, since the novelty in this case is not limited to the construction of the tread, since the construction and assembly of the beads is the important and useful feature of the present invention.

In general it will be seen that the present invention consists in placing several plies of cords upon each other to form a substantial body for the tire. The end portions of the cords are arranged so that looped portions are formed, in which suitable filling means are carried and since the several looped portions in each bead are adjacent each other, it is obvious that they will reinforce each other. The manner in which the projections 27 fit upon the outwardly extending portions 12, 18, and 24 will tend to hold the looped portions in their proper assembled conditions and prevent them from losing their correct shapes when in use. Since several looped portions are formed in each bead and these looped portions are filled with such filling means as will prevent them from yielding when under pressure and they are reinforced, it is apparent that reinforced beads are formed.

It has been found from actual experience and use of tires constructed in accordance with the present invention, that the beads will fit close to the rim of a wheel, thus correctly retaining the tire upon the wheel, while such objectional actions as rim cutting and the like are eliminated. The invention is not only possessed of merit from the view point of utility, but it is cheaply manufactured.

While one practical form of construction and assembly of the present invention has been shown and described, it is apparent that slight changes may be made in the construction, without departing from the spirit of the invention, as long as such changes do not exceed the scope of the invention as claimed.

Having illustrated and described the present invention, what is claimed as new is:

In a tire of the character described, the combination of a first ply of cords having converging end portions terminating in outwardly extending portions, a second ply of cords positioned on said first ply of cords, said second ply of cords having parallel straight end portions engaging the tips of said outwardly extending portions of said first ply, thus forming inclosed looped portions, a third ply of cords positioned upon said second ply and having parallel straight end portions bearing upon the parallel straight end portions of the second ply, the end portions of the third ply terminating in outwardly extending portions, a fourth ply of cords positioned upon said third ply, said fourth ply of cords having parallel straight end portions engaging the tip ends of the outwardly extending portions of said third ply, thereby forming inclosed looped portions adjacent the first mentioned looped portions, a fifth ply of cords fitting upon the fourth ply and having parallel straight end portions fitting upon the parallel straight end portions of the fourth ply and terminating in outwardly extending portions, a sixth ply of cords positioned upon the fifth ply and having parallel straight end portions engaging the tip ends of the outwardly extending portions of the fifth ply, thus forming inclosed looped portions adjacent the second mentioned looped portions, said last-mentioned parallel straight end portions of the sixth ply terminating in elongated inwardly extending projections fitting upon the outwardly extending portions of the first, third, and fifth plies, and filling means carried within said looped portions, thus forming reinforced beads upon said tire, as and for the purposes set forth.

In testimony whereof I hereunto affix my signature.

CHARLES L. ARCHER.